United States Patent
Wu et al.

(10) Patent No.: US 12,463,412 B2
(45) Date of Patent: Nov. 4, 2025

(54) CURRENT SHARING APPARATUS AND CONTROL METHOD

(71) Applicant: Reed Semiconductor Corporation, Warwick, RI (US)

(72) Inventors: Wenkai Wu, East Greenwich, RI (US); Yingqian Ma, Chengdu (CN); Cheng-Wei Chen, East Greenwich, RI (US); Weidong Zhu, East Lyme, CT (US); Qian Chen, Bedford, NH (US)

(73) Assignee: Reed Semiconductor Corporation, Warwick, RI (US)

( * ) Notice: Subject to any disclaimer, the term of this patent is extended or adjusted under 35 U.S.C. 154(b) by 539 days.

(21) Appl. No.: 17/819,965

(22) Filed: Aug. 16, 2022

(65) Prior Publication Data
US 2024/0063627 A1 Feb. 22, 2024

(51) Int. Cl.
*H02H 3/05* (2006.01)
*G01R 19/00* (2006.01)
*H02H 3/08* (2006.01)

(52) U.S. Cl.
CPC .............. *H02H 3/05* (2013.01); *G01R 19/003* (2013.01); *H02H 3/08* (2013.01)

(58) Field of Classification Search
CPC . G01R 19/0092; G01R 19/2513; G01R 31/08
See application file for complete search history.

(56) References Cited

U.S. PATENT DOCUMENTS

| | | | |
|---|---|---|---|
| 2005/0046438 A1* | 3/2005 | Tam | G11C 7/062 324/76.11 |
| 2008/0204958 A1* | 8/2008 | Shearon | H02H 3/18 361/93.9 |
| 2010/0007217 A1* | 1/2010 | Steele | H02J 1/001 307/131 |
| 2017/0250604 A1* | 8/2017 | Ouyang | H02H 9/004 |
| 2018/0358816 A1* | 12/2018 | Kondo | H02J 7/00714 |

\* cited by examiner

*Primary Examiner* — Huy Q Phan
*Assistant Examiner* — Temilade S Rhodes-Vivour
(74) *Attorney, Agent, or Firm* — AP3 Law Firm PLLC

(57) ABSTRACT

An apparatus includes a plurality of switches connected in parallel between an input terminal and an output terminal of a power bus, a plurality of current sensing circuits coupled to the plurality of switches, wherein each current sensing circuit is coupled to a corresponding switch, and a plurality of current sharing circuits configured to receive current sensing signals from the plurality of current sensing circuits and generate a plurality of gate drive signals to control the plurality of switches so as to achieve a predetermined current distribution among the plurality of switches.

14 Claims, 4 Drawing Sheets

CURRENT SHARING APPARATUS AND CONTROL METHOD

TECHNICAL FIELD

The present invention relates to a current sharing apparatus, and, in particular embodiments, to a control method and apparatus for achieving a predetermined current distribution among a plurality of electronic fuses connected in parallel.

BACKGROUND

As technologies further advance, a variety of Internet based information processing services, such as media streaming, cloud computing and/or the like, have become popular. The Internet based information processing services require sharing information over networks. The information sharing over the networks demands a plurality of data centers for collecting, storing, processing, and distributing a large amount of data used in the information processing services.

A data center is a facility (e.g., one building) configured to house a large number of computer servers and associated components. The large number of computer servers are configured to process and respond to information service requests (e.g., multimedia streaming) from various users connected to the data center through the Internet.

Data center power is an essential element in designing and operating efficient and reliable data centers. In order to provide efficient and reliable power to a data center, a variety of power conversion circuits have been employed to generate various supply voltages for processors of the data center. In the power conversion circuits, fuses are used to protect the circuits from being damaged by various fault conditions (e.g., overcurrent).

A traditional fuse may be implemented as a metal wire or strip. The metal wire or strip is designed to heat up and melt or vaporize when too much current (e.g., the current flowing through it exceeds the normal current for a specific time) flows through it. Once the fuse is triggered, the fuse has to be replaced by a new one. As technologies further advance, the traditional fuses are increasingly replaced by circuit breakers. A circuit breaker is an automatically operated electrical switch designed to protect an electrical circuit from being damaged by overcurrent. The circuit breaker may include an electro-mechanical relay. Once an over-current (e.g., a current exceeding the nominal current) is detected, the electro-mechanical relay is triggered to disconnect the electrical circuit from the power supply. In many applications (e.g., power conversion circuits in data centers), circuit breakers may be implemented using a power switch (e.g., a MOSFET, an IGBT or the like) to disconnect the electrical circuit from the power supply in case of an over-current. Such electronic circuit breakers may also be referred to as electronic fuses.

In the data center industry, the safety concerns (e.g., overcurrent protection) have become much more important. Electronic fuses have been widely used to address the safety concerns. More particularly, a plurality of electronic fuses are connected in parallel between an input terminal and an output terminal of a power bus. The input terminal may be coupled to a power source having an output voltage in a range from 12 V to 48 V. The output terminal may be coupled to a load (e.g., processors of the data center). In some applications, the plurality of electronic fuses is designed to support a high current level up to 50 A.

In operation, the performance of the plurality of electronic fuses is not as good as it could be due to a variety of reasons. First, the power loss is not evenly distributed among the plurality of electronic fuses. The on resistance versus the gate drive voltage curve may vary due to semiconductor fabrication process variations. Such variations may cause an uneven current distribution among the plurality of electronic fuses even if the plurality of electronic fuses is driven by a same gate drive voltage. Second, the heat caused by the power loss is not dissipated efficiently. The thermal relief capability of each electronic fuse may be different because of board density. The heat can be dissipated efficiently if the currents flowing through the plurality of electronic fuses can be allocated based on the thermal relief capability of each electronic fuse.

It would be desirable to have a simple control scheme for distributing the power loss evenly among the plurality of electronic fuses. In addition, the control scheme is able to achieve a balanced thermal distribution in consideration with the board density of each electronic fuse. The present disclosure addresses this need.

SUMMARY

These and other problems are generally solved or circumvented, and technical advantages are generally achieved, by preferred embodiments of the present disclosure which provide a control method and apparatus for achieving a predetermined current distribution among a plurality of electronic fuses connected in parallel.

In accordance with an embodiment, an apparatus comprises a plurality of switches connected in parallel between an input terminal and an output terminal of a power bus, a plurality of current sensing circuits coupled to the plurality of switches, wherein each current sensing circuit is coupled to a corresponding switch, and a plurality of current sharing circuits configured to receive current sensing signals from the plurality of current sensing circuits and generate a plurality of gate drive signals to control the plurality of switches so as to achieve a predetermined current distribution among the plurality of switches.

In accordance with another embodiment, a method comprises providing power to a load through a plurality of power switches connected in parallel, detecting currents flowing through the plurality of power switches, and based on detected currents, adjusting gate drive signal of the plurality of power switches so as to achieve a balanced current distribution among the plurality of power switches.

In accordance with yet another embodiment, a system comprises a first switch, a second switch and a third switch connected in parallel between an input terminal and an output terminal of a power bus, a first current sensing circuit configured to generate a first current signal proportional to a first current flowing through the first switch, and generate a first average current signal based on the first current flowing through the first switch, a second current sensing circuit configured to generate a second current signal proportional to a second current flowing through the second switch, and generate a second average current signal based on the second current flowing through the second switch, a third current sensing circuit configured to generate a third current signal proportional to a third current flowing through the third switch, and generate a third average current signal based on the third current flowing through the third switch, and a plurality of current sharing circuits configured to receive current sensing signals from the first current sensing circuit, the second current sensing circuit and the third current sensing circuit, and generate gate drive signals to control the first switch, the second switch and the third switch so as to achieve a predetermined current distribution among the first switch, the second switch and the third switch.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a control method and apparatus for achieving a predetermined current distribution among a plurality of electronic fuses connected in parallel. The invention may also be applied, however, to a variety of power converters and power systems. Hereinafter, various embodiments will be explained in detail with reference to the accompanying drawings.

Figure 1:
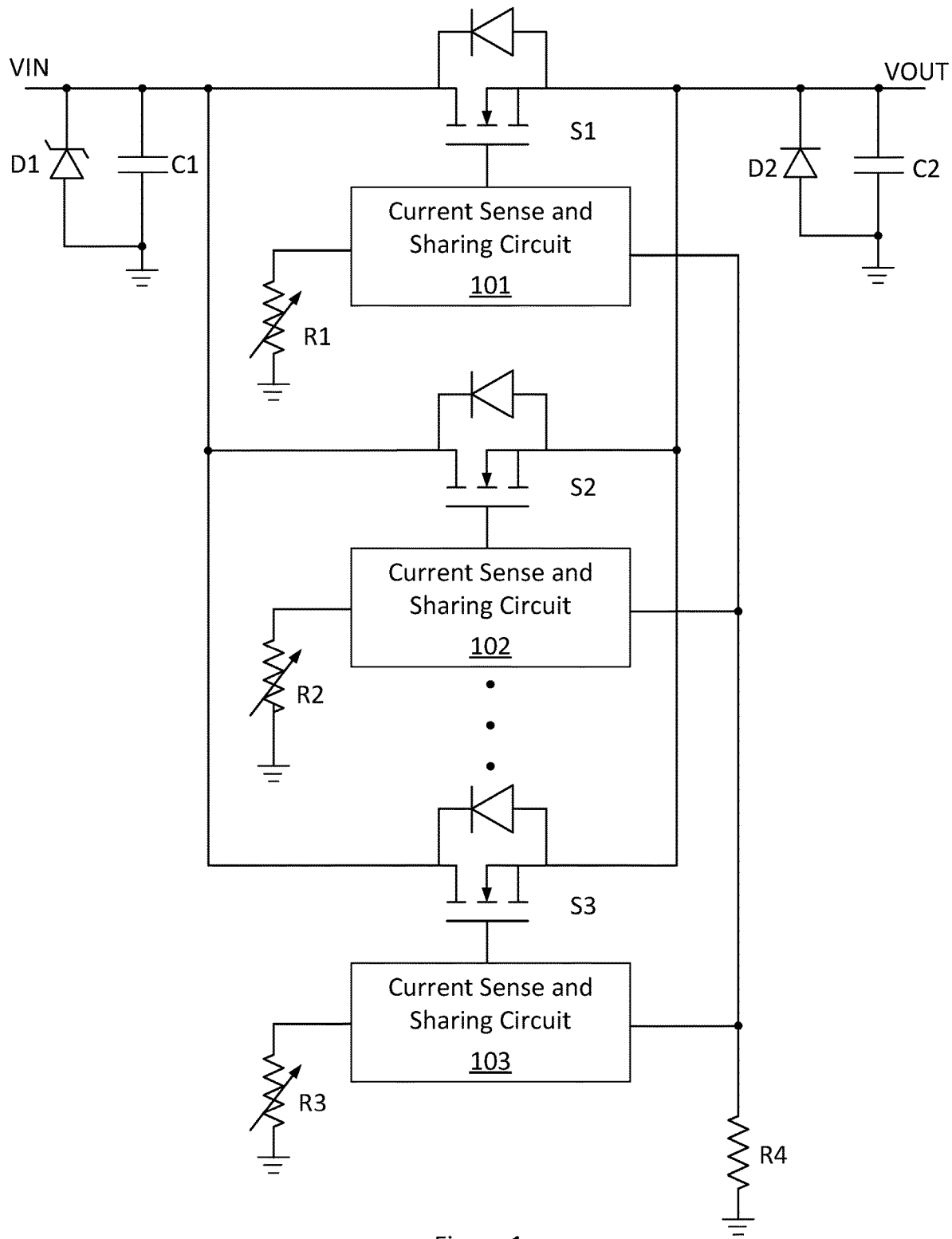
FIG. 1 illustrates a block diagram of a power system including a plurality of electronic fuses in accordance with various embodiments of the present disclosure.

FIG. 1 illustrates a block diagram of a power system including a plurality of electronic fuses in accordance with various embodiments of the present disclosure. The power system comprises a plurality of electronic fuses connected in parallel between an input terminal VIN and an output terminal VOUT of a power bus. In some embodiments, the electronic fuses are implemented as power switches. As shown in FIG. 1, a plurality of power switches S1, S2 and S3 is connected in parallel between the input terminal VIN and the output terminal VOUT.

In accordance with an embodiment, the power switches of FIG. 1 may be MOSFET devices. Alternatively, the power switches can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 1 shows the power switch (e.g., S1) is implemented as a single n-type transistor, a person skilled in the art would recognize there may be many variations, modifications and alternatives. For example, depending on different applications and design needs, the power switch may be implemented as a p-type transistor. Furthermore, the power switch shown in FIG. 1 may be implemented as a plurality of switches connected in parallel.

As shown in FIG. 1, a Zener diode D1 and an input capacitor C1 are connected in parallel between VIN and ground. The Zener diode D1 is employed to protect the power system from an overvoltage condition. A diode D2 and an output capacitor C2 are connected in parallel between VOUT and ground. The capacitors C1 and C2 are employed to reduce ripple voltage, thereby providing steady input and output voltages.

As shown in FIG. 1, a plurality of current sensing and sharing circuits 101, 102 and 103 is coupled to the plurality of switches. Each current sensing and sharing circuit (e.g., current sensing and sharing circuit 101) has three terminals. As shown in FIG. 1, a first terminal of the current sensing and sharing circuit 101 is coupled to a gate of S1. A second terminal of the current sensing and sharing circuit 101 is coupled to a first adjustable resistor R1. A third terminal of the current sensing and sharing circuit 101 is coupled to an auxiliary resistor R4. Likewise, a first terminal of the current sensing and sharing circuit 102 is coupled to a gate of S2. A second terminal of the current sensing and sharing circuit 102 is coupled to a second adjustable resistor R2. A third terminal of the current sensing and sharing circuit 102 is coupled to the auxiliary resistor R4. A first terminal of the current sensing and sharing circuit 103 is coupled to a gate of S3. A second terminal of the current sensing and sharing circuit 103 is coupled to a third adjustable resistor R3. A third terminal of the current sensing and sharing circuit 103 is coupled to the auxiliary resistor R4.

It should be noted that FIG. 1 illustrates only three electronic fuses and their associated current sensing and sharing circuits of a power system that may include hundreds of such electronic fuses. The number of electronic fuses illustrated herein is limited solely for the purpose of clearly illustrating the inventive aspects of the various embodiments. The present disclosure is not limited to any specific number of electronic fuses.

The current sensing and sharing circuits shown in FIG. 1 are of a same structure. For simplicity, only the current sensing and sharing circuit 101 is discussed below in detail. The current sensing and sharing circuit 101 comprises two portions, namely a current sensing circuit and a current sharing circuit. The current sensing circuit comprises a sense switch and a current signal processing circuit. The current sensing circuit is configured to sense the current flowing through S1. In particular, a scaled-down current flows through the sense switch. The current signal processing circuit is configured to convert the scaled-down current into a current signal and an average current signal. The current signal flows through the first adjustable resistor R1 to generate a voltage signal across R1. This voltage signal is proportional to the current flowing through S1. The average current signal flows through R4. As shown in FIG. 1, the average current signals generated by the plurality of current sensing and sharing circuits are summed together at R4 to generate a voltage signal representing the average current of the currents flowing through the plurality of electronic fuses.

The current sharing circuit of the current sensing and sharing circuit 101 comprises a comparator. An inverting input of the comparator is configured to receive the voltage across R1 representing the current flowing through S1. A non-inverting input of the comparator is configured to receive the voltage across R4 representing the average current.

In operation, two control mechanisms may be applied to the power system. A first control mechanism is employed to achieve a balanced current distribution among the plurality of electronic fuses. A second control mechanism is employed to achieve a better thermal balance among the plurality of electronic fuses.

Under the first control mechanism, the comparator of the current sensing and sharing circuit 101 is configured to compare the current flowing through S1 with the average current. When the current flowing through S1 is greater than the average current, the comparator is configured to lower the gate drive voltage applied to the gate of S1. As a result of reducing the gate drive voltage, the on resistance of S1 increases. The increased on resistance of S1 helps to reduce the current flowing through S1. On the other hand, when the current flowing through S1 is less than the average current, the comparator is configured to increase the gate drive voltage applied to the gate of S1. As a result of increasing the gate drive voltage, the on resistance of S1 reduces. The reduced on resistance of S1 helps to increase the current flowing through S1. By applying the first control mechanism described above to all current sensing and sharing circuits, the power system shown in FIG. 1 is able to achieve a balanced current distribution among the plurality of electronic fuses.

Under the second control mechanism, the thermal relief capabilities of the plurality of electronic fuses are considered. In some embodiments, the plurality of electronic fuses shown in FIG. 1 may have different thermal relief capabilities. For example, the power switch S1 occupies a large board area. The power switch S2 occupies a small board area. The thermal relief capability of S1 is better than the thermal relief capability of S2. In operation, the resistance value of the first adjustable resistor S1 is reduced. As a result, the current sensing gain of the power switch S1 is reduced. In response to the reduced current sensing gain, the current flowing through S1 increases. S1 has a better thermal relief capability. S1 is able to handle the extra heat caused by the increased current. On the other hand, the resistance value of the second adjustable resistor S2 is increased. As a result, the current sensing gain of the power switch S2 is increased. In response to the increased current sensing gain, the current flowing through S2 is reduced. The reduced current helps to reduce the thermal stress on S2. By applying the second control mechanism described above to all current sensing and sharing circuits, the power system shown in FIG. 1 is able to achieve a better thermal balance among the plurality of electronic fuses.

It should be noted that the first control mechanism is applicable to the power system shown in FIG. 1 during and after the soft start process of the power system. The second control mechanism is applicable to the power system shown in FIG. 1 only when the power system finishes the soft start process.

Figure 2:
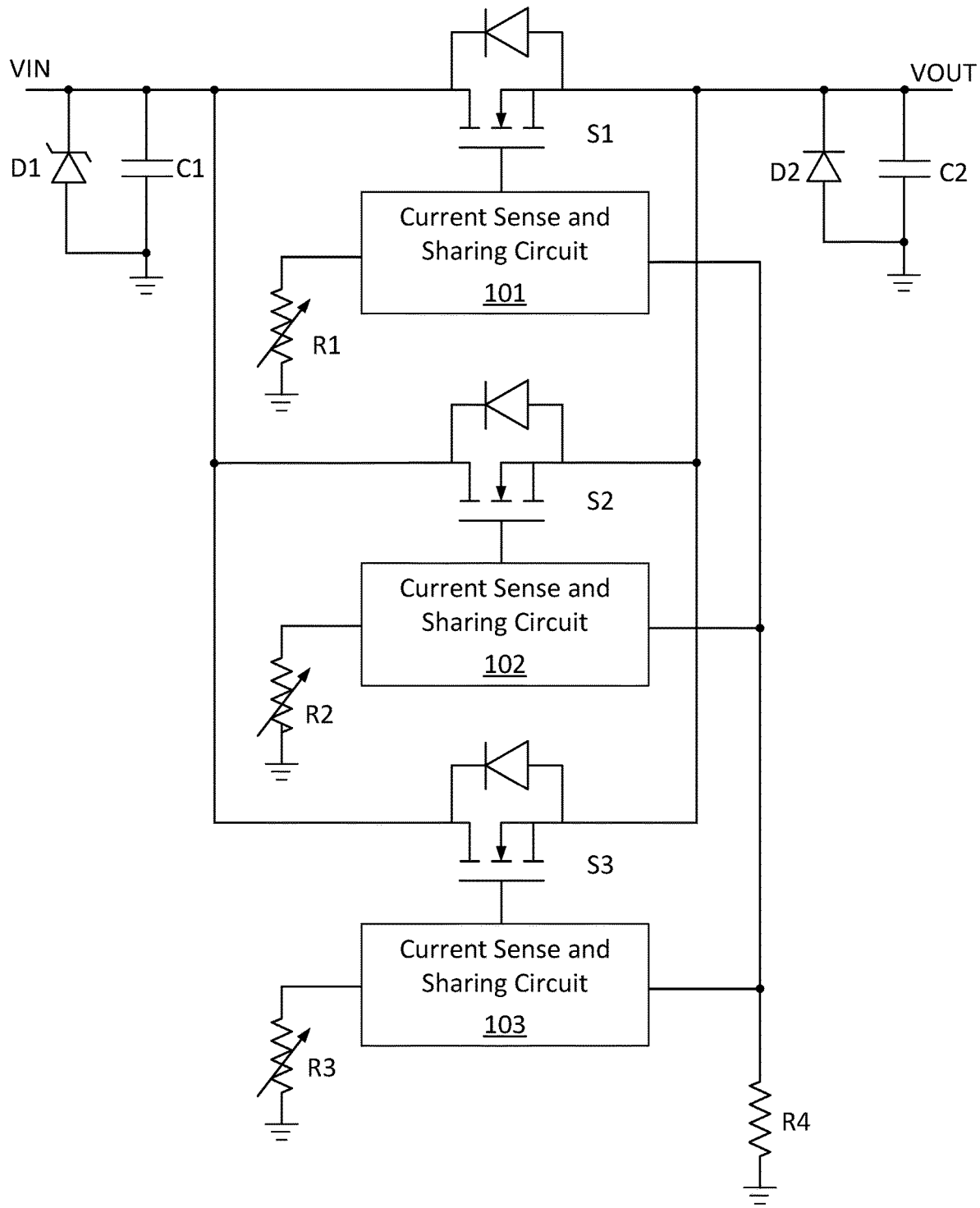
FIG. 2 illustrates a block diagram of a power system including three electronic fuses in accordance with various embodiments of the present disclosure.

FIG. 2 illustrates a block diagram of a power system including three electronic fuses in accordance with various embodiments of the present disclosure. The system configuration shown in FIG. 2 is similar to that shown in FIG. 1 except that three electronic fuses are connected in parallel between VIN and VOUT. As shown in FIG. 2, these three electronic fuses are implemented as three power switches S1, S2 and S3.

In some embodiments, power is provided from a power source coupled to VIN to a load coupled to VOUT through a first switch S1, a second switch S2 and a third switch S3 connected in parallel. In some embodiments, in order to achieve a balanced heat dissipation in the power system, the current is distributed evenly among these three switches. However, due to various operating condition variations, the current may be not distributed evenly among switches S1, S2 and S3. The current sensing and sharing circuits 101, 102 and 103 are employed to detect the current flowing through each power switch, and determine the gate drive signal of each power switch based on the detected current signals. More particularly, when a current flowing through one power switch (e.g., S1) is greater than the average current flowing through the three power switches, the gate drive voltage of this power switch is reduced to lower the current flowing through the power switch. On the other hand, when a current flowing through one power switch (e.g., S1) is less than the average current flowing through the three power switches, the gate drive voltage of this power switch is increased to increase the current flowing through the power switch.

In operation, the first current sensing and sharing circuit 101 is configured to generate a first current signal proportional to a first current flowing through the first switch S1. The first current signal is applied to a first adjustable resistor R1. In addition, the first current sensing and sharing circuit 101 is configured to generate a first average current signal based on the first current flowing through the first switch. The first average current signal is applied to an auxiliary resistor R4.

In operation, the second current sensing and sharing circuit 102 is configured to generate a second current signal proportional to a second current flowing through the second switch S2. The second current signal is applied to a second adjustable resistor R2. In addition, the second current sensing and sharing circuit 102 is configured to generate a second average current signal based on the second current flowing through the second switch. The second average current signal is applied to the auxiliary resistor R4.

In operation, the third current sensing and sharing circuit 103 is configured to generate a third current signal proportional to a third current flowing through the third switch S3. The third current signal is applied to a third adjustable resistor R3. In addition, the third current sensing and sharing circuit 103 is configured to generate a third average current signal based on the third current flowing through the third switch S3. The third average current signal is applied to the auxiliary resistor R4.

The first average current signal, the second average current signal and the third average current signal are summed together at the auxiliary resistor R4. The voltage across R4 represents an average current of the currents flowing through S1, S2 and S3. The voltage across R1 represents the current flowing through S1. In other words, the voltage across R1 is proportional to the current flowing through S1. Likewise, the voltage across R2 represents the current flowing through S2. The voltage across R3 represents the current flowing through S3.

In order to achieve a balanced current distribution among the three switches, three comparators are employed to generate the gate drive signals of S1, S2 and S3 based on comparing the currents flowing through the three switches with the average current. More particular, the first current sensing and sharing circuit 101 comprises a first comparator configured to process current signals from the first switch. The second current sensing and sharing circuit 102 comprises a second comparator configured to process current signals from the second switch. The third current sensing and sharing circuit 103 comprises a third comparator configured to process current signals from the third switch.

In operation, the first current signal is fed into the first adjustable resistor R1 connected to an inverting input of the first comparator. The second current signal is fed into the second adjustable resistor R2 connected to an inverting input of the second comparator. The third current signal is fed into the third adjustable resistor R3 connected to an inverting input of the third comparator. A non-inverting input of the first comparator, a non-inverting input of the second comparator and a non-inverting input of the third comparator are connected together and further connected to the auxiliary resistor R4. In some embodiments, the first adjustable resistor R1, the second adjustable resistor R2 and the third adjustable resistor R3 are of a same resistance value. The resistance value of the auxiliary resistor R4 is equal to one third of a resistance value of the first adjustable resistor R1.

In operation, the first comparator is configured to generate a first gate drive signal applied to a gate of the first switch based on comparing the voltage across R1 with the voltage across R4. The second comparator is configured to generate a second gate drive signal applied to a gate of the second switch based on comparing the voltage across R2 with the voltage across R4. The third comparator is configured to generate a third gate drive signal applied to a gate of the third switch based on comparing the voltage across R3 with the voltage across R4.

The first control mechanism described above with respect to FIG. 1 is also applicable to the power system shown in FIG. 2. When the current flowing through one switch (e.g., S1) is less than the average current, the gate drive voltage of S1 is increased so as to increase the current flowing through S1. When the current flowing through this switch is greater than the average current, the gate drive voltage of S1 is reduced so as to reduce the current flowing through S1. By applying the first control mechanism to all three switches S1, S2 and S3, the power system shown in FIG. 2 can achieve a balanced current distribution among these power switches.

The second control mechanism described above with respect to FIG. 1 is also applicable to the power system shown in FIG. 2. One switch (e.g., S1) may have a better thermal relief capability. The corresponding adjustable resistor is adjusted to lower the current sensing gain. Once the current gain is lowered, an increase current flows through the switch having a better thermal capability. By applying the second control mechanism to all three switches S1, S2 and S3, the power system shown in FIG. 2 can achieve a better thermal balance.

The first current sensing and sharing circuit 101, the second current sensing and sharing circuit 102 and the third current sensing and sharing circuit 103 shown in FIG. 2 are of a same structure. For simplicity, only the structure and the operating principle of the first current sensing and sharing circuit 101 are discussed in detail below with respect to FIG. 3.

Figure 3:
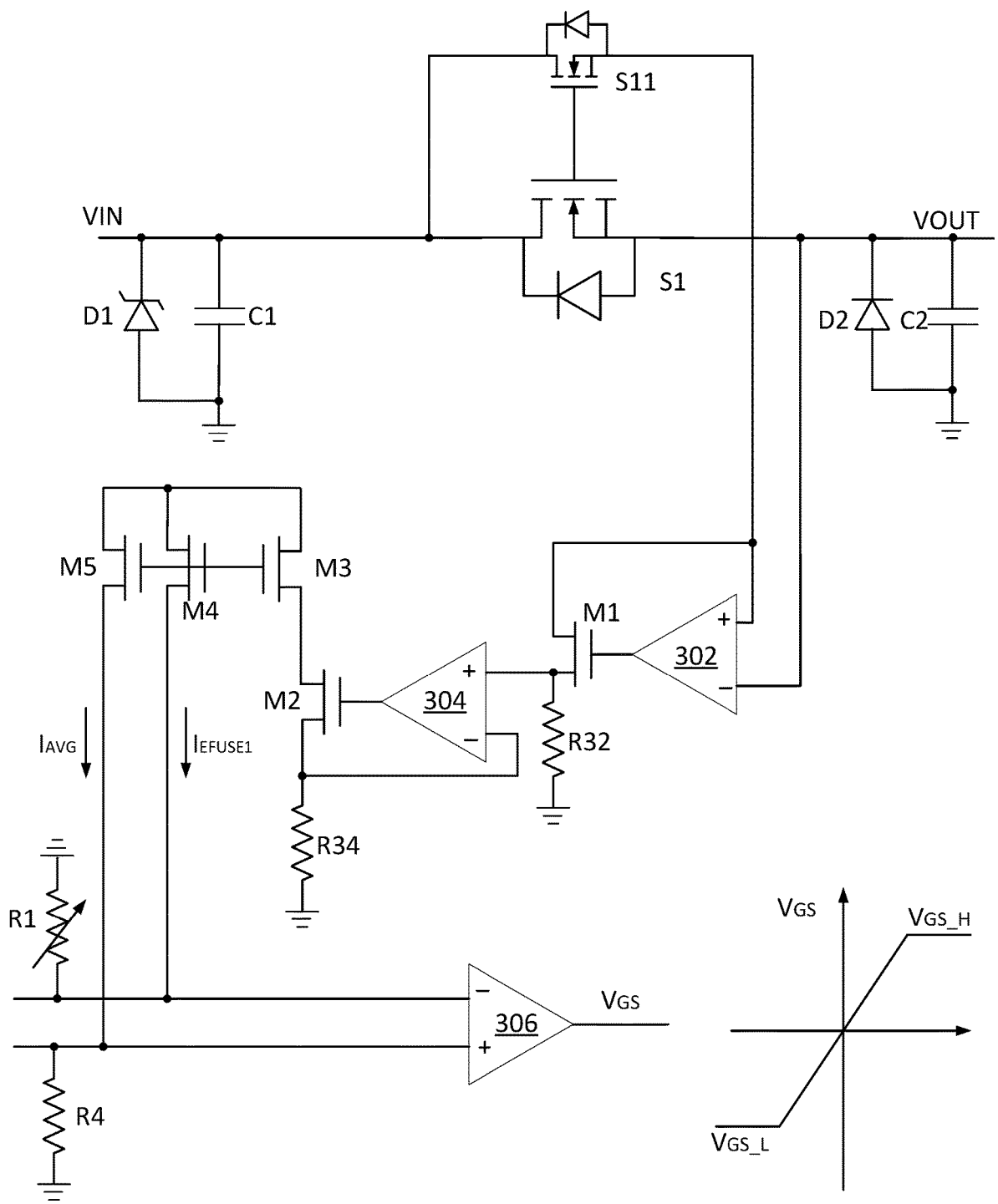
FIG. 3 illustrates a schematic diagram of an electronic fuse and the associated current sensing and sharing circuit in accordance with various embodiments of the present disclosure.

FIG. 3 illustrates a schematic diagram of an electronic fuse and the associated current sensing and sharing circuit in accordance with various embodiments of the present disclosure. The first current sensing and sharing circuit 101 includes two portions, namely a current sensing portion and a current sharing portion. As shown in FIG. 3, the current sensing portion comprises a sense switch S11, a first amplifier 302, a first transistor M1, a resistor R32, a second amplifier 304, a resistor R34, a second transistor M2, a first current mirror transistor M3, a second current mirror transistor M4 and a third current mirror transistor M5. In some embodiments, transistors M3, M4 and M5 are p-type transistors. The first current mirror transistor M3, the second current mirror transistor M4 and the third current mirror transistor M5 form a current mirror. The current sharing portion comprises a comparator 306, a first adjustable resistor R1 and an auxiliary R4.

As shown in FIG. 3, a drain of the sense switch S11 is connected to a drain of the first switch S1. Two input terminals of the first amplifier 302 are connected to a source of the sense switch S11 and a source of the first switch S1, respectively. An output of the first amplifier 302 is connected to a gate of the first transistor M1. M1 is an n-type transistor. As shown in FIG. 3, the first transistor M1 and the resistor R32 are connected in series between the non-inverting terminal of the first amplifier 302 and ground. In some embodiments, the resistance value of R32 is in a range from 1 K to 100 K.

The second transistor M2 and the resistor R34 are connected in series between the current mirror and ground. M2 is an n-type transistor. In some embodiments, the resistance value of R34 is in a range from 1 K to 100 K.

The non-inverting input of the second amplifier 304 is connected to a common node of the first transistor M1 and the resistor R32. The inverting input of the second amplifier 304 is connected to a common node of the second transistor M2 and R34. An output of the second amplifier is connected to a gate of the second transistor M2.

The current mirror comprises the first current mirror transistor M3, the second current mirror transistor M4 and the third current mirror transistor M5. The first current mirror transistor M3 is connected in series with the second transistor M2 and the second resistor R34. The second current mirror transistor M4 is configured to generate a first current signal $I_{EFUSE1}$. The third current mirror transistor M5 is configured to generate a first average current signal $I_{AVG}$. Gates of the first current mirror transistor M3, the second current mirror transistor M4 and the third current mirror transistor M5 are connected to each other.

An inverting input of the comparator 306 is configured to receive the voltage signal across R1. The voltage signal across R1 is proportional to the current flowing through S1. A non-inverting input of the comparator 306 is configured to receive the voltage signal across R4. The voltage signal across R4 represents an average current of the currents flowing through S1, S2 and S3.

As shown in FIG. 3, the drain of S11 is connected to the drain of S1. The gate of S11 is connected to the gate of S1. According to the operating principle of the first amplifier 302, there is an equivalent short circuit between the two input terminals of the first amplifier 302. In other words, the voltage at the source of S1 is equal to the voltage at the source of S11. S11 and S1 form a current mirror. The current flowing through S1 is mirrored in S11. The ratio of the current mirror is dependent on the physical characteristics of S1 and S11. In some embodiments, the ratio of the current flowing through S1 to the current flowing through S11 is in a range from 5000:1 to 6000:1. The first amplifier 302 controls the current mirror such that the current flowing through M1 and R32 is equal to the current flowing through S11. As a result, the voltage across R32 is proportional to the current flowing through S1.

The second amplifier 304 functions as a buffer stage. This buffer stage is employed to adjust the current sensing gain. The current sensing gain can be adjusted by varying the resistance value of R34. According to the operating principle of the second amplifier 304, the voltage across R34 is equal to the voltage across R32. The current flowing through R34, M2 and M3 is proportional to the current flowing through S1.

M3, M4 and M5 form another current mirror. The current flowing through M3 is mirrored in M4 to generate the first current signal $I_{EFUSE1}$. The ratio of the first current signal to the current flowing through S1 is in a range from 5 uA/A to 10 uA/A.

As shown in FIG. 3, the first current signal is applied to R1. In some embodiments, the resistance value of R1 is in a range from 1 K to 10 K. The voltage across R1 is proportional to the current flowing through S1. The current flowing through M3 is also mirrored in M5 to generate the first average current signal $I_{AVG}$. As shown in FIG. 3, the first average current signal is applied to R4. It should be noted the second average current signal and the third average current signal are also applied to R4. The first average current signal, the second average current signal and the third average current signal are summed together at R4 to generate an average current signal. In other words, the voltage across R4 represents the average current of the currents flowing through S1, S2 and S3.

The comparator 306 generates a gate drive signal for S1 based on comparing the voltage across R1 (the current flowing through S1) with the voltage across R4 (the average current). The gate drive voltage of S1 is increased when the current flowing through S1 is less than the average current. The gate drive voltage of S1 is reduced when the current flowing through S1 is greater than the average current. By adjusting the gate drive voltage, the power system is able to achieve a balanced current distribution among the power switches. Furthermore, the resistance value of R1 may be adjusted based on the thermal relief capability of S1. For example, when S1 has a better thermal relief capability (e.g., S1 occupies a large board area), the resistance value of R1 may be reduced so as to increase the current flowing through S1. By adjusting the resistance value of R1, the power system is able to achieve a better thermal balance.

FIG. 3 further shows an upper limit and a lower limit of the gate drive voltage of S1. In some embodiments, the upper limit is 5.5 V. The lower limit is 4.5 V.

Figure 4:
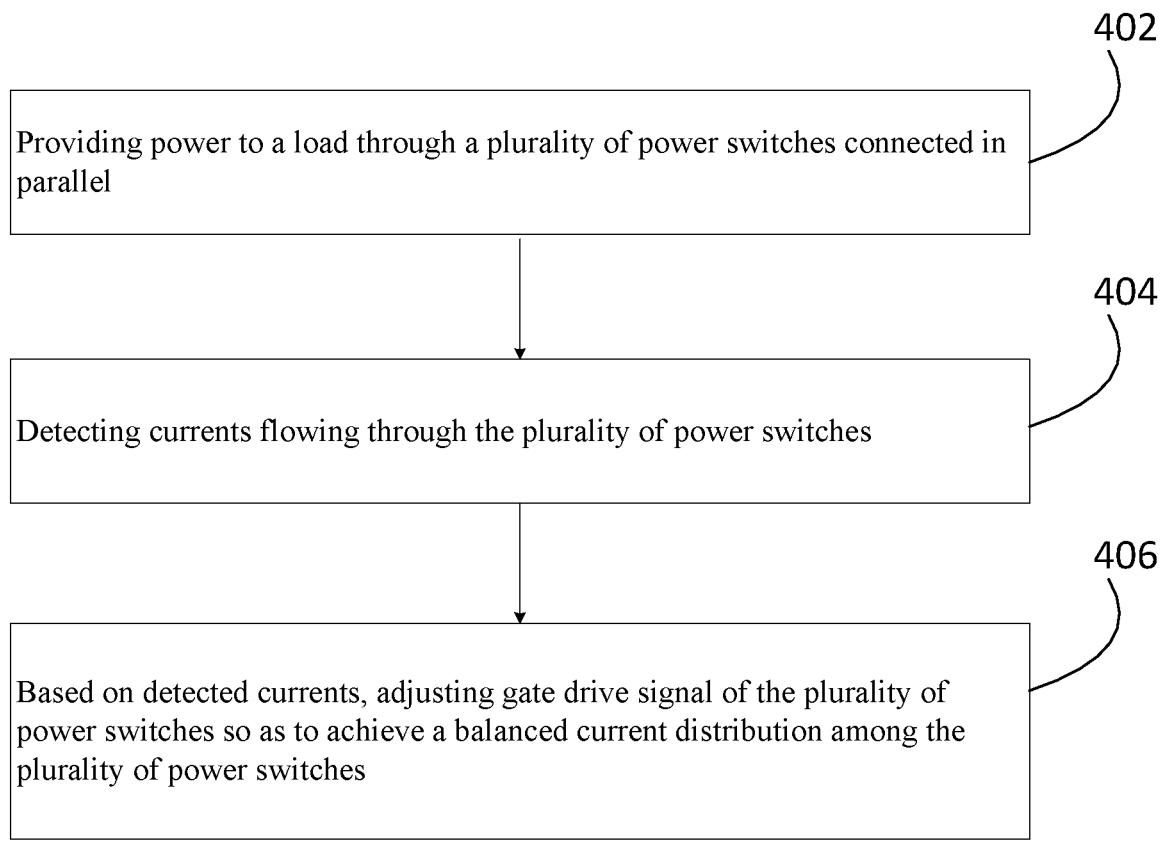
FIG. 4 illustrates a flow chart of a control method for the current sensing and sharing circuit shown in FIGS. 2 and 3 in accordance with various embodiments of the present disclosure.

FIG. 4 illustrates a flow chart of a control method for the current sensing and sharing circuit shown in FIGS. 2 and 3 in accordance with various embodiments of the present disclosure. This flowchart shown in FIG. 4 is merely an example, which should not unduly limit the scope of the claims. One of ordinary skill in the art would recognize many variations, alternatives, and modifications. For example, various steps illustrated in FIG. 4 may be added, removed, replaced, rearranged and repeated.

Referring back FIG. 2, a first switch, a second switch and a third switch connected in parallel between an input terminal and an output terminal of a power bus. A first current sensing circuit is configured to generate a first current signal proportional to a first current flowing through the first switch, and generate a first average current signal based on the first current flowing through the first switch. A second current sensing circuit is configured to generate a second current signal proportional to a second current flowing through the second switch, and generate a second average current signal based on the second current flowing through the second switch. A third current sensing circuit is configured to generate a third current signal proportional to a third current flowing through the third switch, and generate a third average current signal based on the third current flowing through the third switch. A plurality of current sharing circuits is configured to receive current sensing signals from the first current sensing circuit, the second current sensing circuit and the third current sensing circuit, and generate gate drive signals to control the first switch, the second switch and the third switch so as to achieve a predetermined current distribution among the first switch, the second switch and the third switch.

At step 402, power is provided to a load through a plurality of power switches connected in parallel. Each power switch functions as an electronic fuse.

At step 404, currents flowing through the plurality of power switches are detected.

At step 406, based on detected currents, gate drive signal of the plurality of power switches are adjusted so as to achieve a balanced current distribution among the plurality of power switches.

The method further comprises configuring the plurality of power switches to operate as a plurality of electronic fuses, wherein each electronic fuse is used to provide overcurrent protection. In some embodiments, the load is a plurality of servers in a data center.

The method further comprises providing power to the load through a first switch, a second switch and a third switch connected in parallel, generating a first current signal proportional to a first current flowing through the first switch, and generating a first average current signal based on the first current flowing through the first switch, generating a second current signal proportional to a second current flowing through the second switch, and generating a second average current signal based on the second current flowing through the second switch, and generating a third current signal proportional to a third current flowing through the third switch, and generating a third average current signal based on the third current flowing through the third switch.

The method further comprises generating a first voltage signal through feeding the first current signal into a first adjustable resistor, generating a second voltage signal through feeding the second current signal into a second adjustable resistor, generating a third voltage signal through feeding the third current signal into a third adjustable resistor, and generating an average current signal through feeding the first average current signal, the first average current signal and the third average current signal into an auxiliary resistor.

The method further comprises configuring a first comparator to generate a first gate drive signal applied to a gate of the first switch based on comparing the first voltage signal with the average current signal, wherein a gate drive voltage of the first gate drive signal is increased when the first voltage signal is less than the average current signal, and the gate drive voltage of the first gate drive signal is reduced when the first voltage signal is greater than the average current signal.

The method further comprises configuring a second comparator to generate a second gate drive signal applied to a gate of the second switch based on comparing the second voltage signal with the average current signal, wherein a gate drive voltage of the second gate drive signal is increased when the second voltage signal is less than the average current signal, and the gate drive voltage of the second gate drive signal is reduced when the second voltage signal is greater than the average current signal.

The method further comprises configuring a third comparator to generate a third gate drive signal applied to a gate of the third switch based on comparing the third voltage signal with the average current signal, wherein a gate drive voltage of the third gate drive signal is increased when the third voltage signal is less than the average current signal, and the gate drive voltage of the third gate drive signal is reduced when the third voltage signal is greater than the average current signal.

The first adjustable resistor is connected to an inverting input of the first comparator. The second adjustable resistor is connected to an inverting input of the second comparator. The third adjustable resistor is connected to an inverting input of the third comparator. A non-inverting input of the first comparator, a non-inverting input of the second comparator and a non-inverting input of the third comparator are connected together and further connected to the auxiliary resistor, and wherein the first adjustable resistor, the second adjustable resistor and the third adjustable resistor are adjusted to achieve a predetermined heat distribution among the plurality of switches.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
   a plurality of switches connected in parallel between an input terminal and an output terminal of a power bus;
   a plurality of current sensing circuits coupled to the plurality of switches, wherein each current sensing circuit is coupled to a corresponding switch; and
   a plurality of current sharing circuits configured to receive current sensing signals from the plurality of current sensing circuits and generate a plurality of gate drive signals to control the plurality of switches so as to achieve a predetermined current distribution among the plurality of switches, wherein each current sensing circuit comprises a sense switch and a current signal processing circuit, and wherein the current signal processing circuit is configured to generate a current signal and an average current signal, and wherein a drain of the sense switch is connected to a drain of the corresponding switch; and the current signal processing circuit comprises a first amplifier, a first transistor, a first resistor, a second amplifier, a second transistor, a second resistor and a current mirror, and wherein:
   a non-inverting input and an inverting input of the first amplifier are connected to a source of the sense switch and a source of the corresponding switch, respectively;
   an output of the first amplifier is connected to a gate of the first transistor;
   the first transistor and the first resistor are connected in series between the non-inverting input of the first amplifier and ground;
   a non-inverting input of the second amplifier is connected to a common node of the first transistor and the first resistor;
   an output of the second amplifier is connected to a gate of the second transistor; and
   the second transistor and the second resistor are connected in series between the current mirror and ground, wherein a common node of the second transistor and the second resistor is connected to an inverting input of the second amplifier.

2. The apparatus of claim 1, wherein:
   the current mirror comprises a first current mirror transistor, a second current mirror transistor and a third current mirror transistor, and wherein:
   the first current mirror transistor is connected in series with the second transistor and the second resistor;
   the second current mirror transistor is configured to generate the current signal; and
   the third current mirror transistor is configured to generate the average current signal, and wherein gates of the first current mirror transistor, the second current mirror transistor and the third current mirror transistor are connected to each other.

3. The apparatus of claim 2, wherein:
   the plurality of current sharing circuits comprises a plurality of comparators, and wherein an inverting input of each comparator is configured to receive a first voltage signal proportional to the current signal, and a non-inverting input of each comparator is configured to receive a second voltage signal proportional to the average current signal.

4. The apparatus of claim 3, wherein:
   the plurality of current sharing circuits comprises a first comparator configured to process current signals from a first switch of the plurality of switches, a second comparator configured to process current signals from a second switch of the plurality of switches and a third comparator configured to process current signals from a third switch of the plurality of switches, and wherein the first switch, the second switch and the third switch are connected in parallel.

5. The apparatus of claim 4, wherein:
   non-inverting inputs of the first comparator, the second comparator and the third comparator are connected to each other and further connected to an auxiliary resistor;

an inverting input of the first comparator is connected to a first adjustable resistor;
an inverting input of the second comparator is connected to a second adjustable resistor; and
an inverting input of the third comparator is connected to a third adjustable resistor.

6. The apparatus of claim 5, wherein:
the first adjustable resistor, the second adjustable resistor and the third adjustable resistor are of a same resistance value; and
a resistance value of the auxiliary resistor is equal to one third of a resistance value of the first adjustable resistor.

7. The apparatus of claim 5, wherein:
the first adjustable resistor, the second adjustable resistor and the third adjustable resistor are adjusted to achieve a predetermined heat distribution among the plurality of switches.

8. A method comprising:
providing power to a load through a plurality of power switches connected in parallel;
detecting currents flowing through the plurality of power switches; and
based on detected currents, adjusting gate drive signal of the plurality of power switches so as to achieve a balanced current distribution among the plurality of power switches, wherein the steps above further comprise:
providing power to the load through a first switch, a second switch and a third switch connected in parallel;
generating a first current signal proportional to a first current flowing through the first switch, and generating a first average current signal based on the first current flowing through the first switch;
generating a second current signal proportional to a second current flowing through the second switch, and generating a second average current signal based on the second current flowing through the second switch;
generating a third current signal proportional to a third current flowing through the third switch, and generating a third average current signal based on the third current flowing through the third switch;
generating a first voltage signal through feeding the first current signal into a first adjustable resistor;
generating a second voltage signal through feeding the second current signal into a second adjustable resistor;
generating a third voltage signal through feeding the third current signal into a third adjustable resistor; and
generating an average current signal through feeding the first average current signal, the first average current signal and the third average current signal into an auxiliary resistor.

9. The method of claim 8, further comprising:
configuring the plurality of power switches to operate as a plurality of electronic fuses, wherein each electronic fuse is used to provide overcurrent protection.

10. The method of claim 8, further comprising:
configuring a first comparator to generate a first gate drive signal applied to a gate of the first switch based on comparing the first voltage signal with the average current signal, wherein a gate drive voltage of the first gate drive signal is increased when the first voltage signal is less than the average current signal, and the gate drive voltage of the first gate drive signal is reduced when the first voltage signal is greater than the average current signal;
configuring a second comparator to generate a second gate drive signal applied to a gate of the second switch based on comparing the second voltage signal with the average current signal, wherein a gate drive voltage of the second gate drive signal is increased when the second voltage signal is less than the average current signal, and the gate drive voltage of the second gate drive signal is reduced when the second voltage signal is greater than the average current signal; and
configuring a third comparator to generate a third gate drive signal applied to a gate of the third switch based on comparing the third voltage signal with the average current signal, wherein a gate drive voltage of the third gate drive signal is increased when the third voltage signal is less than the average current signal, and the gate drive voltage of the third gate drive signal is reduced when the third voltage signal is greater than the average current signal.

11. The method of claim 10, wherein:
the first adjustable resistor is connected to an inverting input of the first comparator;
the second adjustable resistor is connected to an inverting input of the second comparator;
the third adjustable resistor is connected to an inverting input of the third comparator; and
a non-inverting input of the first comparator, a non-inverting input of the second comparator and a non-inverting input of the third comparator are connected together and further connected to the auxiliary resistor, and wherein the first adjustable resistor, the second adjustable resistor and the third adjustable resistor are adjusted to achieve a predetermined heat distribution among the plurality of switches.

12. A system comprising:
a first switch, a second switch and a third switch connected in parallel between an input terminal and an output terminal of a power bus;
a first current sensing circuit configured to generate a first current signal proportional to a first current flowing through the first switch, and generate a first average current signal based on the first current flowing through the first switch;
a second current sensing circuit configured to generate a second current signal proportional to a second current flowing through the second switch, and generate a second average current signal based on the second current flowing through the second switch;
a third current sensing circuit configured to generate a third current signal proportional to a third current flowing through the third switch, and generate a third average current signal based on the third current flowing through the third switch; and
a plurality of current sharing circuits configured to receive current sensing signals from the first current sensing circuit, the second current sensing circuit and the third current sensing circuit, and generate gate drive signals to control the first switch, the second switch and the third switch so as to achieve a predetermined current distribution among the first switch, the second switch and the third switch, wherein:
the plurality of current sharing circuits comprises a first comparator, a second comparator and a third comparator, and wherein:
non-inverting inputs of the first comparator, the second comparator and the third comparator are connected together and further connected to an auxiliary resistor;

an inverting input of the first comparator is connected to a first adjustable resistor;
an inverting input of the second comparator is connected to a second adjustable resistor;
an inverting input of the third comparator is connected to a third adjustable resistor;
an output of the first comparator is configured to generate a first gate drive signal applied to the first switch;
an output of the second comparator is configured to generate a second gate drive signal applied to the second switch; and
an output of the third comparator is configured to generate a third gate drive signal applied to the third switch.

13. The system of claim 12, wherein:
the first average current signal, the second average current signal and the third average current signal are summed together at the auxiliary resistor to generate an average current signal;
the first current signal flows through the first adjustable resistor to generate a first signal fed into the inverting input of the first comparator;
the second current signal flows through the second adjustable resistor to generate a second signal fed into the inverting input of the second comparator; and
the third current signal flows through the third adjustable resistor to generate a third signal fed into the inverting input of the third comparator.

14. The system of claim 13, wherein:
the first signal, the second signal and the third signal are adjusted through adjusting values of the first adjustable resistor, the second adjustable resistor and the third adjustable resistor, and wherein as a result of adjusting the first adjustable resistor, the second adjustable resistor and the third adjustable resistor, a predetermined heat distribution among the plurality of switches is achieved.

* * * * *